J. M. RAFTER.

SECTIONAL OR SHEET PILING.

APPLICATION FILED MAY 13, 1911.

Reissued June 20, 1911. 13,259.

WITNESSES

J. W. Millyard

M. C. Butler

INVENTOR

James M. Rafter

BY

Alfred Wilkinson

ATTORNEY

UNITED STATES PATENT OFFICE.

JAMES M. RAFTER, OF NEW YORK, N. Y., ASSIGNOR TO LACKAWANNA STEEL COMPANY, A CORPORATION OF NEW YORK.

SECTIONAL OR SHEET PILING.

13,259. Specification of Reissued Letters Patent. Reissued June 20, 1911.

Original No. 933,665, dated September 7, 1909, Serial No. 475,896. Application for reissue filed May 13, 1911. Serial No. 627,051.

*To all whom it may concern:*

Be it known that I, JAMES M. RAFTER, a citizen of the United States, residing at New York, in the county of New York and State of New York, have invented new and useful Improvements in Sectional or Sheet Piling, of which the following is a specification.

This invention relates to improvements in sectional or sheet piling constructed of steel or other suitable metal and adapted for use for the purposes of ordinary piling and also adapted for use for constructing hollow columns, caissons and other structures and consists in the construction and arrangement of devices hereinafter described and claimed.

Figure 1:
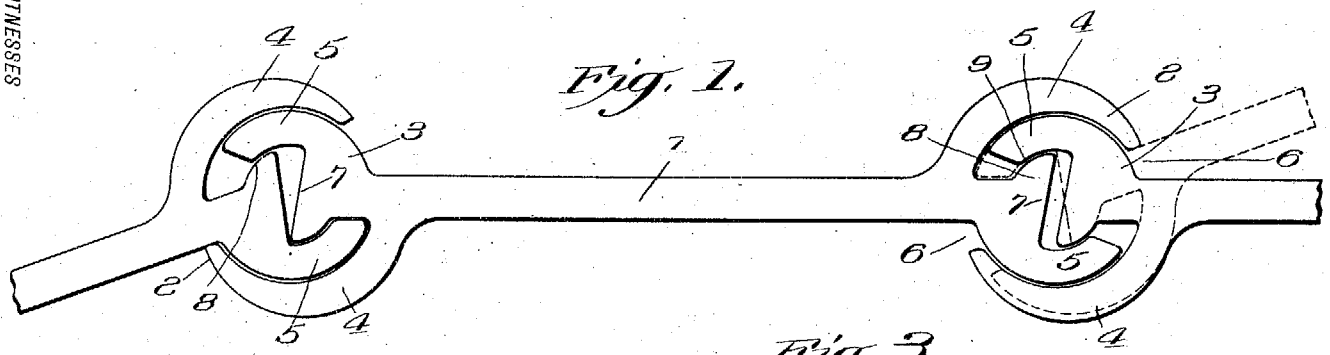
Figure 3:
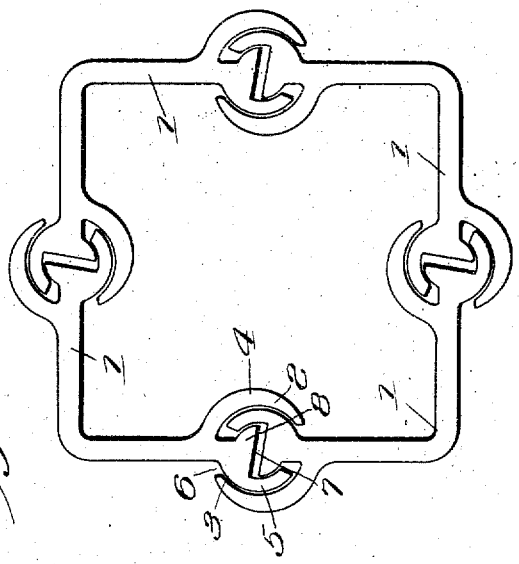
Figure 2:
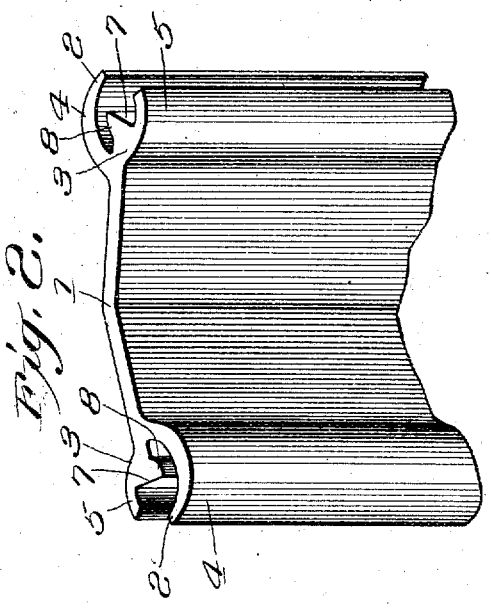

In the accompanying drawings:—Figure 1 is a plan of several sections of sheet piling constructed in accordance with my invention and coupled together for angular movement one with relation to another. Fig. 2 is a detail perspective view of one end portion of one section or sheet of piling embodying a modification. Fig. 3 is a plan showing a number of sections of my sheet or sectional piling arranged to form a hollow column.

In accordance with my invention, each sheet or section 1 of my improved piling is formed of steel or other suitable metal and comprises a web of suitable length, breadth and thickness and coupling heads 2, 3 at opposite side edges thereof and formed preferably integral therewith. Each coupling head comprises a pair of oppositely extending arcuate jaws 4, 5, which are equally semi-circular and which form an opening 6 between their outer ends. The jaw 5 is of less radius than the jaw 4 but is concentric with reference thereto and at the inner end of said jaw 5 is a shoulder 7 which is disposed transversely with reference to the general plane of the web, is at an angle other than a right angle to that of the general plane of the web and on the side opposed to the larger jaw 4, forms a flange 8 the inner side 9 of which is curved and is concentric to and spaced from the larger jaw. The jaws of the respective heads at opposite side edges of the web of the piling are reversely disposed so that the smaller jaw of each head is adapted to enter the space between the larger jaw and the flange 8 of the next opposing head as clearly shown in Figs. 1 and 3 of the drawings. The width of the space 6 somewhat exceeds the thickness of the web of the piling and as will be noticed each smaller arm is free to play both angularly and also to some extent transversely in the space between the larger jaw and the flange 8 between which it is located and the oblique disposition of the outer surface of the shoulders 7 also permit of such play and hence the sections are flexibly coupled together so that they may be disposed angularly with reference to each other and such flexible connections between the sections or sheets greatly facilitate the driving thereof and allow of slight deviation from the straight line in driving the piles.

It will be apparent that the piles may be driven either in line with one another or angularly and hence they may be so disposed as to form a caisson, hollow column or other structure.

The jaws of the respective coupling heads while permitting an angular or lost motion between the sections or sheets interlock to effectually connect and secure the sheets or sections together. In such instances as may make it necessary, the spaces between the members of the coupling heads may be filled with lead or other suitable calk material to prevent leakage between the joints and this will be found especially useful in using the improved sections or sheets for constructing caissons or the like.

The webs of the sections or sheets may be straight as shown in Fig. 1 or they may be bent as shown in Figs. 2 and 3. Other modifications may be made within the scope of the appended claims and I do not therefore desire to limit myself to the precise construction and arrangement of devices herein shown and described.

What is claimed is:—

1. Sheet piling members having coupling heads at their opposing edges, each head having oppositely extending arcuate jaws spaced apart at their outer ends, of unequal radius and concentrically disposed, a shoulder at the inner end of the smaller jaw presenting a plane surface on its outer side extending transversely with respect to the plane of the piling, and obliquely with respect to said plane, said shoulder also forming a flange on the side opposed to the larger jaw, said flange being spaced from said larger jaw, for the purpose set forth.

2. Sheet piling members having coupling heads at their opposing edges, each head having oppositely extending arcuate jaws spaced apart at their outer ends, on unequal radius and concentrically disposed, a shoulder at the inner end of the smaller jaw presenting a plane surface on its outer side extending transversely with respect to the plane of the piling, said shoulder also forming a flange on the side opposed to the larger jaw, said flange being spaced from said larger jaw, for the purpose set forth.

3. A sheet piling member having a coupling head at one of its side edges, said head comprising oppositely extending arcuate jaws, spaced apart at their outer ends, concentrically disposed and one of greater radius than the other.

4. Sheet piling members having coupling heads at their opposing edges, each coupling head having oppositely extending arcuate jaws spaced apart at their outer ends, concentrically disposed and one of less radius than the other, and a shoulder at the inner end of the smaller jaws and extending toward and forming a flange opposite and spaced from the larger jaw, the jaws of the respective heads being reversely disposed, so that the smaller jaws of each head lie between the flange and the larger jaws of the head to which it is coupled.

5. A sheet-piling section having similar coupling heads on its opposite edges, each head being provided with three projections adapted to engage with similar projections on an adjacent pile section, said projections being so formed that adjacent sections are capable of angular adjustment with reference to each other.

6. An integral, steel, sheet-piling section having in combination a web and on each edge thereof a coupling head, said head being provided with three engaging projections to engage with corresponding projections on an adjacent section, the engaging surfaces of the projections on each edge being substantially concentric to permit angular adjustment of adjacent sections with reference to each other.

7. A sheet-piling section having in combination a web and on each edge thereof a coupling head provided with a longer curved jaw and a shorter curved jaw forming a groove, and within the groove an engaging flange.

8. A sheet-piling section having in combination a web and on each edge thereof a coupling head provided with two curved jaws forming a groove whose interior width is greater than the space between the ends of the jaws, and within the groove an engaging flange.

9. A sheet-piling section having in combination a web and on each edge thereof a coupling head provided with two curved jaws forming a groove whose interior width is greater than the space between the ends of jaws, and within the groove an engaging flange the inner surfaces of the jaws and the engaging surface of the flange being substantially concentric to permit angular adjustment of adjacent sections with reference to each other.

10. An integral section for walls of sheet-piling formed of rolled steel with a web and a coupling head on each edge of the web, each coupling head being provided with two curved jaws forming a groove and within the groove an engaging flange said jaws and flange forming three projections for interlocking with corresponding projections on an adjacent section, said interlocking projections being of such size that when the sections are assembled packing spaces will be left within the jaws at each joint, substantially as described and shown.

11. An integral section for walls of steel sheet piling formed of rolled steel and having in combination a web and on each edge thereof a coupling head composed of a longer curved jaw and of a shorter curved jaw forming an interlocking groove and of a flange extending from the shorter jaw toward the longer within the groove, said jaws and said flange forming three interlocking projections for engaging with corresponding projections on an adjacent section and having their engaging surfaces substantially concentric to permit angular adjustment of adjacent interlocking sections, said interlocking projections being of such size that when the sections are assembled three packing spaces will be left within the jaws at each joint, substantially as described and shown.

In testimony whereof, I have signed my name to this specification, in the presence of two subscribing witnesses.

JAMES M. RAFTER.

Witnesses:
J. R. MILLWARD,
M. L. BRESLIN.

Copies of this patent may be obtained for five cents each, by addressing the "Commissioner of Patents. Washington, D. C."